United States Patent [19]

Macheel

[11] 3,735,351

[45] May 22, 1973

[54] REMOTE STATION ADDRESS VERIFICATION USING ADDRESS CONDITIONED ENCODING

[75] Inventor: Gary W. Macheel, Anaheim, Calif.

[73] Assignee: Hydril Company, Los Angeles, Calif.

[22] Filed: June 29, 1971

[21] Appl. No.: 157,923

[52] U.S. Cl...........340/146.1 C, 340/147 C, 340/163

[51] Int. Cl...............................................G08c 25/00

[58] Field of Search........................340/146.1 C, 163, 340/147 C, 150

[56] References Cited

UNITED STATES PATENTS 3,069,657 12/1962 Green, Jr. et al..............340/146.1 C 3,384,873 5/1968 Sharma..........................340/146.1 C

*Primary Examiner*—Charles E. Atkinson

*Attorney*—White, Haefliger & Bachand

[57] ABSTRACT

A selective calling system incorporating a master station and multiple remote stations includes a means for generating the desired remote station address and properly constituted message at the master station, and a means for generating properly constituted response at the remote station. The response from the remote station is generated in a unique and new way and processed at the master station in a unique and new way, such that the validity of the responding remote station's address may be verified without the necessity of including the remote station's address as part of the return message.

6 Claims, 6 Drawing Figures

INVENTOR.
GARY W. MACHEEL

BY White, Haefliger & Bachand

ATTORNEYS.

INVENTOR.
GARY W. MACHEEL

BY White, Haefliger & Bachand

ATTORNEYS.

INVENTOR.
GARY W. MACHEEL
BY
White, Haefliger & Bachand
ATTORNEYS.

REMOTE STATION ADDRESS VERIFICATION USING ADDRESS CONDITIONED ENCODING

BACKGROUND OF THE INVENTION

This invention relates generally to supervisory monitoring and control systems, and more particularly concerns increasing the efficiency of message transmission in such systems.

In many supervisory monitoring and control systems it is necessary to transmit data over some form of data link from a central or master station to one or more remote units. One example of such a system is that described in application Ser. No. 7,818 for U.S. Letters Patent. It is usually very important that the transmitted data and the received data agree, and to detect transmission errors various security codes have been developed. One of the more powerful and often used of these codes is the Bose-Chaudhuri code. In the use of such a code, the data being transmitted is operated on serially with a well chosen prime polynominal, and at the end of the transmission of the normal data word, this operation results in a set of data bits, which can be interpreted as the remainder when the data is divided by this prime polynominal. This quasi-remainder is referred to as the Bose-Chaudhuri or BC code. The data pattern of the latter is then transmitted after the regular data word has been sent, to form one continuous message ending with the BC code. At the receiving end of the data set, the message is again operated upon by the prime polynominal, and if the message has been received with no errors, the results of this quasi-division will be zero. This, then, represents a check on the data validity.

In most data systems having more than one remote unit, many remotes usually operate on the same data channel, and, therefore, may require an identifying code or address in the returned message to indicate that the proper remote unit has responded. Since this identifying code, or address, contains no significant data, its transmission time reduces message efficiency.

SUMMARY OF THE INVENTION

It is a major object of the invention to provide for the elimination of need to include an identifying address in the message returned to the master station. As a result, message transmitting efficiency is enhanced due to substantial reduction in return message transmission time.

Briefly the following outline of a process incorporating the invention summarizes the concept, reference to Bose-Chaudhuri code circuitry being by way of example only:

STEP 1: In the transmission of data to a remote unit from the master station, the remote address is part of the data word transmitted. During this address transmission time, the Bose-Chaudhuri check circuitry at the master station is enabled so as to preprocess the remote address during the master transmission time.

STEP 2: The receiving remote unit performs the Bose-Chaudhuri code check as it would on any other message to determine the validity of the received message.

STEP 3: Before transmitting a message back to the master station, the remote unit first cycles its own address through the Bose-Chaudhuri code generator system. It then begins transmission of the data, applying this data also to its Bose-Chaudhuri code generator. At the end of the regular transmission of data, the BC code is transmitted as the last part of the data message.

STEP 4: The receiving or master station now performs the Bose-Chaudhuri check on the incoming data message, having already preprocessed the address of the remote during its own transmission time. Since the remote unit had preprocessed its address through its BC code generator before its transmission time, it is, in effect, as though the address had been transmitted back from the remote as far as the BC code is concerned. Therefore, if another remote unit should respond incorrectly, the preprocessed BC code information will not agree (due to the difference in preprocessed address information) with anticipated information and the data will not pass the Bose-Chaudhuri check test. The incoming data will, therefore, be rejected as invalid, and the message can be repeated until the proper response is obtained.

More specifically, a typical remote station will include input and output terminals; a generator of message data $D_2(x)$; a supplier of remote station address data $A_n(x)$; and means including encoding apparatus responsive to supplied address data $A_n(x)$ to operate upon $D_2(x)$ to produce a coded data function $R_2(x)$ of $D_2(x)$ which is also a function of $A_n(x)$, and output apparatus to supply $D_2(x)$and $R_2(x)$ to the remote station output terminal for transmission to the master station. Such output apparatus may, for example, include first gating means operable to transmit $D_2(x)$ to the output terminal during a first time interval; and second gating means operable to transmit $R_2(x)$ to the output terminal during a following second time interval.

The master station typically includes equipment operable to transmit input message data $D_1(x)$ together with remote station address data $A_n(x)$ and a coded data function $R_1(x)$ to the remote unit's input terminal. Further, when $D_2(x) + R_2(x)$ is received from the remote station, it is operated on in the check circuitry to verify that the remote station transmitting $R_2(x)$ and $D_2(x)$ in response to master station transmission of $D_1(x)$ and $A_n(x)$ has the desired address defined by $A_n(x)$.

These and other objects and advantages of the invention, as well as the details of an illustrative embodiment will be more fully understood from the following description and drawings.

DRAWING DESCRIPTION

DETAILED DESCRIPTION

Figure 1:
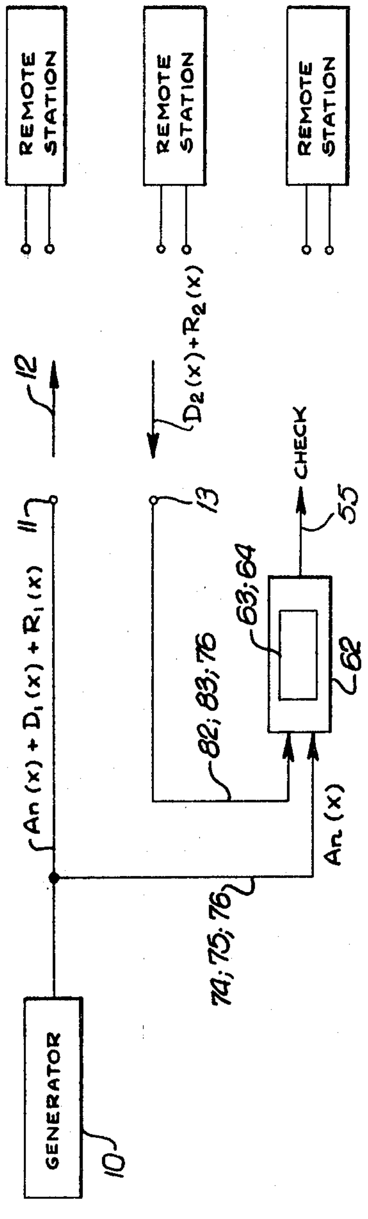
FIG. 1 is a general block diagram of a master station.

In FIG. 1, equipment at the master station is operable to transmit message data $D_1(x)$ plus remote station address data $A_n(x)$ and check character $R_1(x)$ to the communication channel leading to the remote station input terminals. For example, a data set generator 10 produced a message in the form of a polynomial $D_1(x) = d_nx^n +\text{----}+d_1x + d_o$ transmitted to the output terminal 11, along with the address data $A_n(x)$. For check purposes, there is also transmitted to the terminal 11 a check character which may be derived by dividing $A_n(x)$ and $D_1(x)$ by a generator prime polynomial (Bose-Chaudhuri Code, for example), to derive the check character as a "remainder" $R_1(x)$. Accordingly, one continuous message $A_n(x) + D_1(x) + R_1(x)$ is transmitted on the channel 12. Generator 10 may be considered as incorporating equipment to derive $R_1(x)$.

Figure 2:
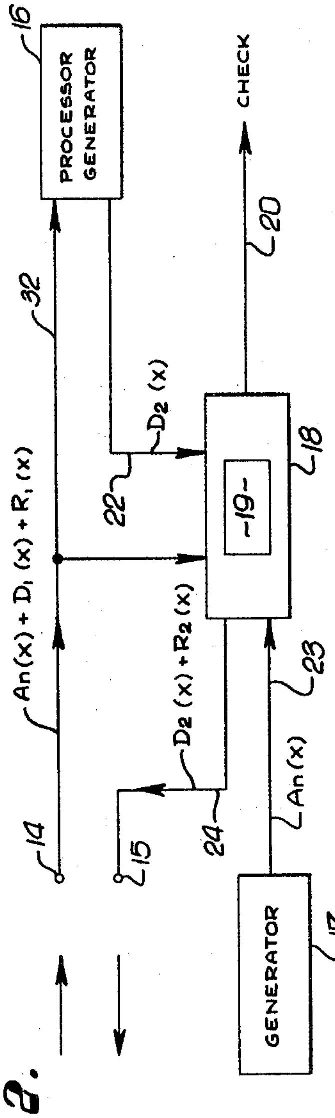
FIG. 2 is a general block diagram of a remote station.

At the remote station corresponding to the address $A_n(x)$, and as seen in FIG. 2, there are provided input and output terminals 14 and 15; a unit 16 which may be considered as an input message processor and a generator of return message data $D_2(x)$; a generator 17 of remote station address data $A_n(x)$; and means 18. The latter may include serial arithmetic equipment operable to divide $A_n(x)$, $D_1(x)$ and $R_1(x)$ by a generator polynomial $G(x)$ (as for example is provided by code generator 19), as the message is received bit-by-bit serially, and if the transmitted message is received without error, the remainder of this division process is equal to zero, at the check output 20. If the remainder of this division process is not zero, this condition indicates that the received message is not error free. This process is described in U.S. Pat. No. 3,336,467.

Means 18 is also responsive to address data $A_n(x)$ (supplied on channel 23) and $D_2(x)$ (transmitted on line 22) to produce a coded data function $R_2(x)$ the latter then also being a function of $A_n(x)$ ). Line 24 permits transmission of $D_2(x) + R_2(x)$ to output terminal 15.

Figure 4:
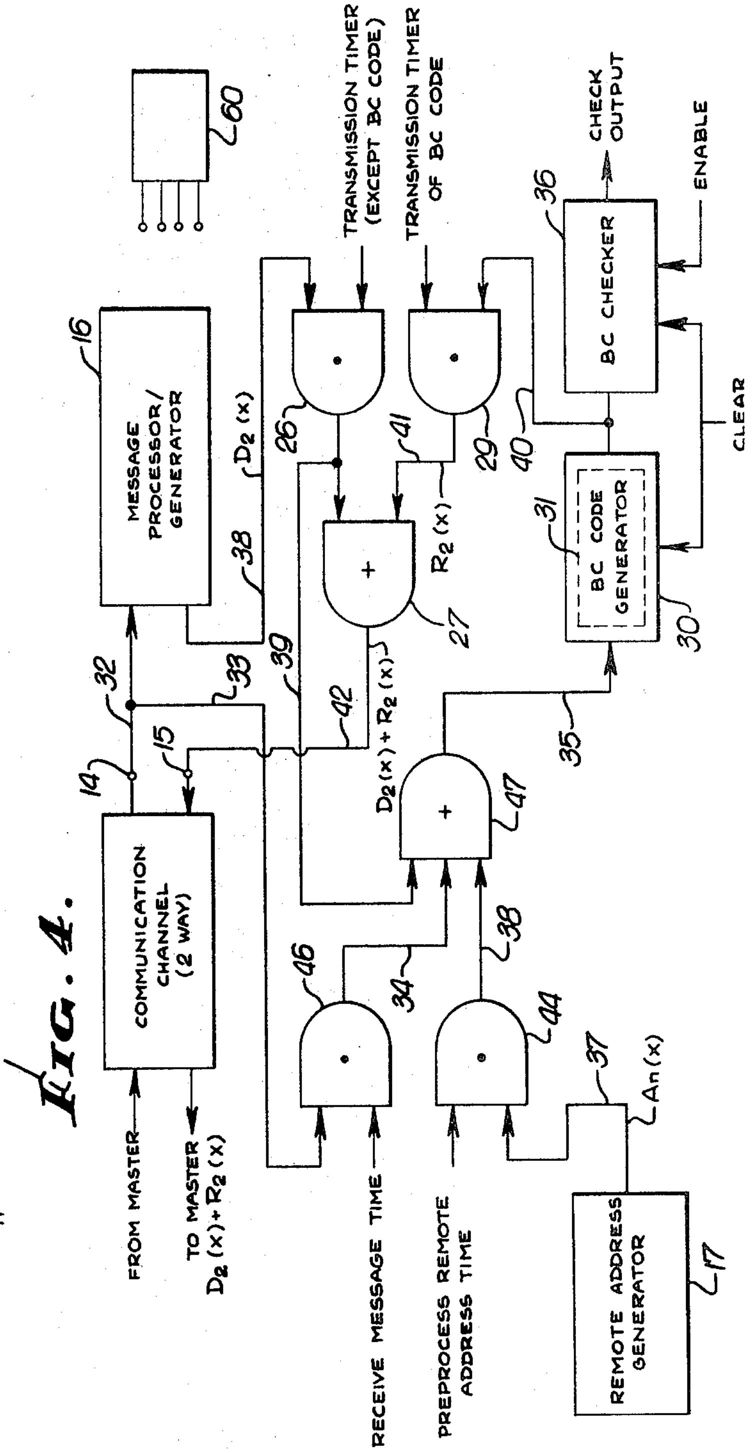
FIG. 4 is a more detailed block diagram of a FIG. 2 type remote station.

More specifically, and referring to FIG. 4, the means 18 may include encoding apparatus 30, incorporating a code (as for example Bose-Chaudhuri) generator 31 and (divider) 36 operable to receive $A_n(x) + D_1(x) + R_1(x)$ via lines 32 – 35 for performing the division of $A_n(x)$, $D_1(x)$ and $R_1(x)$ by $G(x)$, as referred to. The apparatus 30 also operates to receive $A_n(x)$ via lines 37, 38 and 35, during pre-process time interval 52 seen in wave form D of FIG. 6, to condition the encoder for operating upon $D_2(x)$ received via lines 38, 39 and 35. $A_n(x)$ and $D_2(x)$ thus operated upon produces $R_2(x)$ on line 40, as referred to above, for transmission to output terminal 15 via lines 41 and 42. Thus, the remainder $R_2(x)$ is a function of both $D_2(x)$ and $A_n(x)$.

Figure 6:
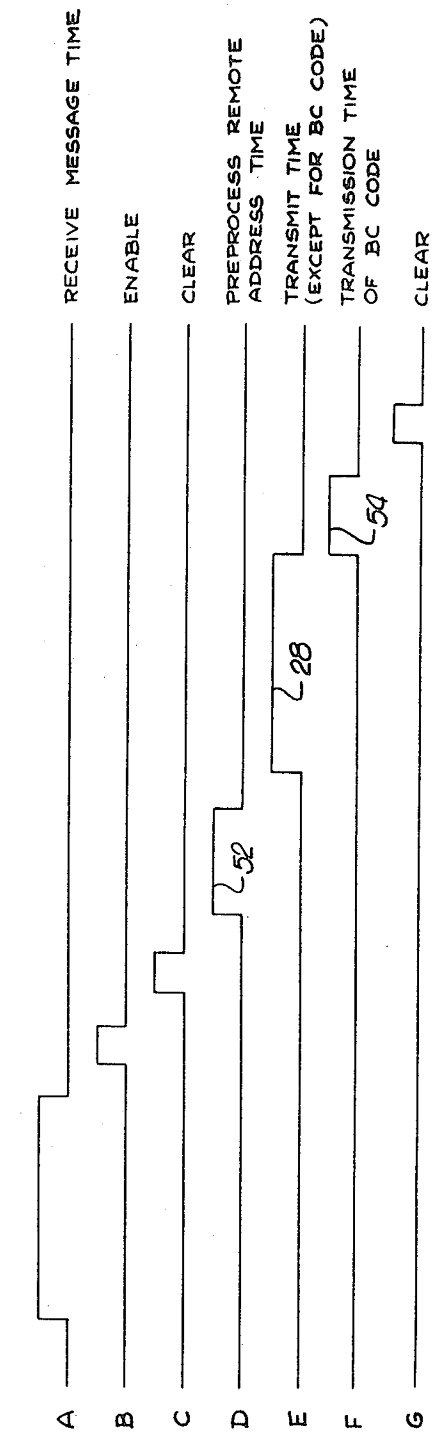

A first AND gate means 26 is operable to transmit $D_2(x)$ to lines 39 and 42 during time interval 28 in wave form E of FIG. 6; and second AND gate means 29 is operable to transmit $R_2(x)$ to lines 41 and 42 during time interval 54 in wave form F of FIG. 6, whereby $R_2(x)$ immediately follows $D_2(x)$ in the message transmitted to the master station. Clock means 60 is operable to enable the AND gates in accordance with the FIG. 6 wave forms. AND gate 46 connecting lines 33 and 34 is enabled in accordance with wave form A in FIG. 6, and OR gate 47 is connected between lines 34, 38 and 39, and line 35. AND gate 44 connecting lines 37 and 38 is enabled in accordance with wave form D of FIG. 6.

Figure 3:
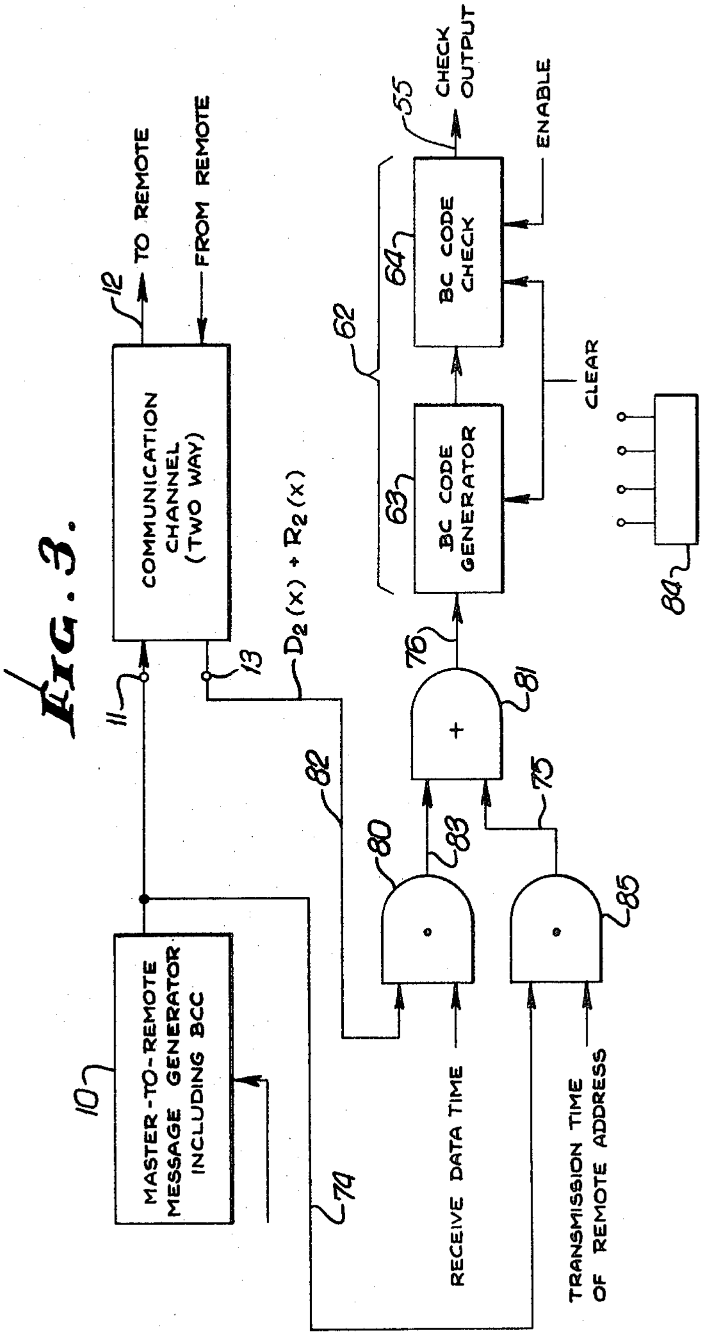
FIG. 3 is more detailed block diagram of a FIG. 1 type master station.

Referring to FIGS. 1 and 3, the incoming message $D_2(x) + R_2(x)$ is transmitted to means 62, which may include a code generator (Bose-Chaudhuri) 63 and BC code check circuitry 64. Means 62 has previously received (via lines 74, 75 and 76) the transmitted address data $A_n(x)$ to pre-produce a coded version $R'_n(x)$ thereof. Upon reception of $D_2(x) + R_2(x)$ transmitted by the remote station, the check circuitry processes this information continuing from the state of $R'_n(x)$. Since $R_2(x)$ has been conditioned by $A_n(x)$ at the remote station, the code generator 63 at the master station in effect "sees" the address $A_w(x)$ of the remote station. Therefore, if an incorrect remote station has responded, the processing remainder $R_3(x)$ will not be zero, and the data will not pass the check test. The incoming data will, therefore, be rejected, and the message can be repeated until the proper response is obtained.

Figure 5:
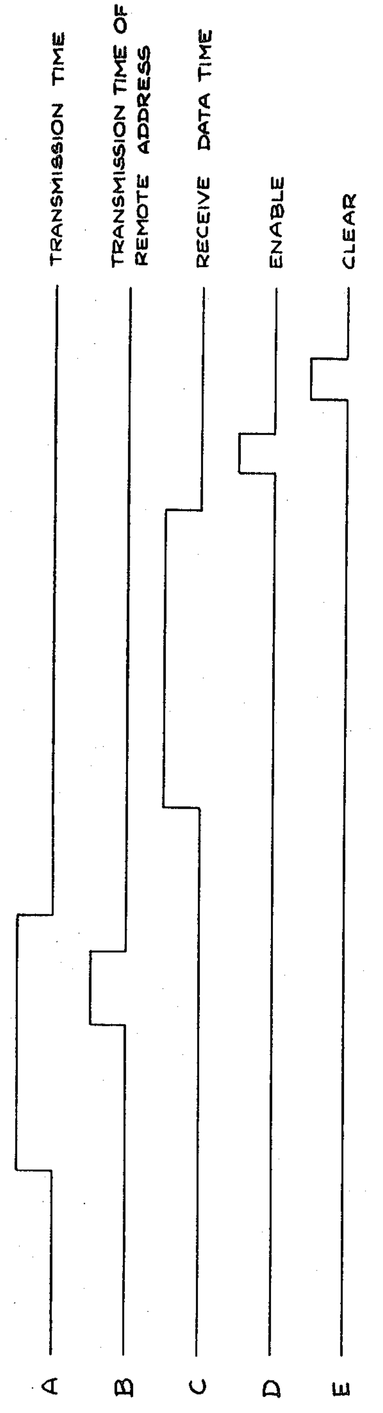
FIG. 5 and 6 are wave form diagrams associated with FIG. 3 and 4 stations.

AND and OR gates 80 and 81 connect lines 82, 83 and 76 as seen in FIG. 3, wave form C in FIG. 5 indicating the enabling of gate 80 as by clock 84. AND gate 85 is enabled as in wave form B in FIG. 5 to transmit $A_n(x)$ to 63 via lines 74, 75 and 76.

I claim:

1. For use in a data transmission system having a master station and multiple remote stations, the combination at a remote station of:

a. input and output terminals, b. a generator of message data $D_2(x)$, the input terminal operatively connected to said generator, c. first means including encoding apparatus responsive to supplied address data $A_n(x)$ to operate upon $D_2(x)$ and $A_n(x)$ to produce a coded data function $R_2(x)$, and output apparatus to supply $D_2(x)$ and $R_2(x)$ to the output terminal.

2. The combination of claim 1 including an input message processor at said remote station, input means to supply input message data $D_1(x)$ plus address data $A_n(x)$ plus a check character $R_1(x)$ at the input terminal to said first means and to said processor, and means to operate upon $D_1(x) + A_n(x) + R_1(x)$ to establish validity to transmission thereof.

3. The combination of claim 2 wherein said output apparatus includes first gating means operable to transmit $D_2(x)$ to the output terminal during a first time interval, and second gating means operable to transmit $R_2(x)$ to the output terminal during a following and second interval.

4. Multiple remote stations as defined in claim 2, and including master station equipment operable to transmit said $D_1(x) + A_n(x) + R_1(x)$ to the remote station input terminals.

5. The combination of claim 4 including means at the master station having encoding equipment and responsive to the transmitted remote station address data $A_n(x)$ to pre-produce a coded function $R'(x)$ of $A_n(x)$.

6. The combination of claim 5 including check circuitry at the master station and operable to process the received $D_2(x)$ and $R_2(x)$ from the remote station and, in conjunction with the pre-processed $R'(x)$, to determine that the address of the responding remote terminal is the desired $A_n(x)$.

* * * * *